US008280786B1

(12) United States Patent
Weiss et al.

(10) Patent No.: US 8,280,786 B1
(45) Date of Patent: Oct. 2, 2012

(54) METHOD AND SYSTEM FOR VIRTUAL REPRESENTATION OF CURRENCY

(75) Inventors: Benjamin R. Weiss, Portola Valley, CA (US); Mary Lunneborg Rosen, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 852 days.

(21) Appl. No.: 12/253,733

(22) Filed: Oct. 17, 2008

(51) Int. Cl.
*G07B 17/00* (2006.01)
*G07F 19/00* (2006.01)
*G06Q 20/00* (2012.01)
*G06Q 30/00* (2012.01)

(52) U.S. Cl. .............. 705/30; 705/16; 705/17; 705/26.1
(58) Field of Classification Search .............. 705/25–30, 705/16–17
See application file for complete search history.

(56) References Cited

U.S. PATENT DOCUMENTS

| | | | |
|---|---|---|---|
| 2002/0103711 A1* | 8/2002 | Karas et al. ..................... 705/26 |
| 2002/0120562 A1* | 8/2002 | Opiela et al. .................... 705/39 |
| 2003/0036956 A1* | 2/2003 | Karas et al. ..................... 705/14 |
| 2004/0172359 A1* | 9/2004 | Nakamura ....................... 705/39 |
| 2007/0168266 A1* | 7/2007 | Questembert .................... 705/35 |
| 2008/0301046 A1* | 12/2008 | Martinez et al. ................ 705/39 |
| 2010/0042535 A1* | 2/2010 | Stone .............................. 705/39 |

* cited by examiner

Primary Examiner — Ig T An
(74) Attorney, Agent, or Firm — Osha Liang LLP

(57) ABSTRACT

The invention relates to a method for representing a transfer of currency during a transaction. The method involves establishing a network connection with a computing device, receiving, from the computing device, transactional data associated with the transaction, receiving currency data associated with a financial account, and displaying a pictorial representation of currency based on the currency data, where a currency type and a currency denomination are depicted as a portion of the pictorial representation. The invention further involves designating an amount of currency from the pictorial representation to obtain image data, where the amount of currency is sufficient to complete the transaction, transmitting the image data to the computing device as part of the transaction, and sending instructions to transfer the amount of currency from the financial account based on the image data and the transactional data.

12 Claims, 8 Drawing Sheets

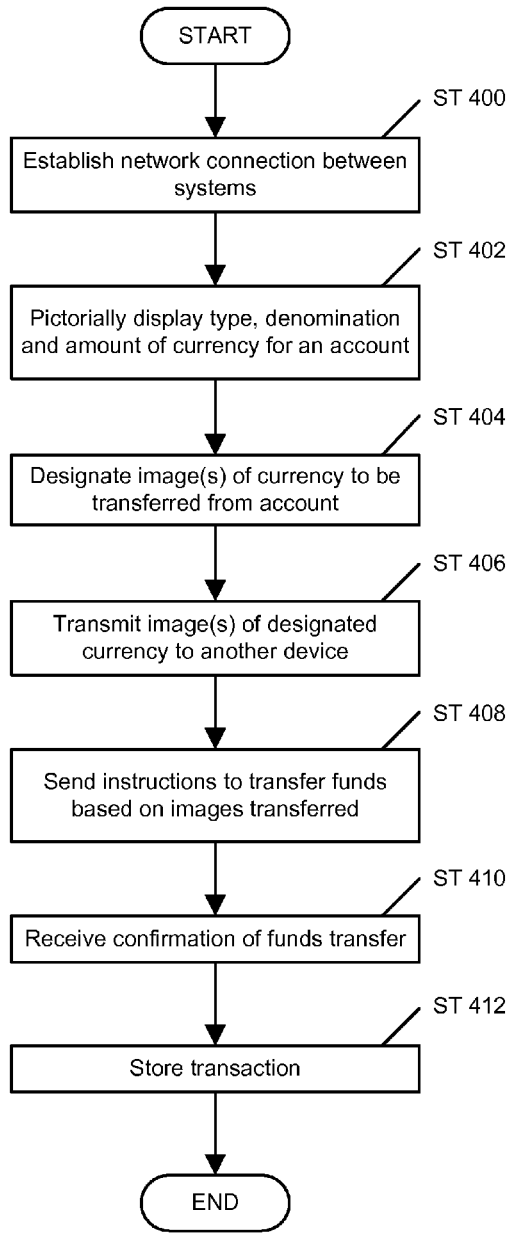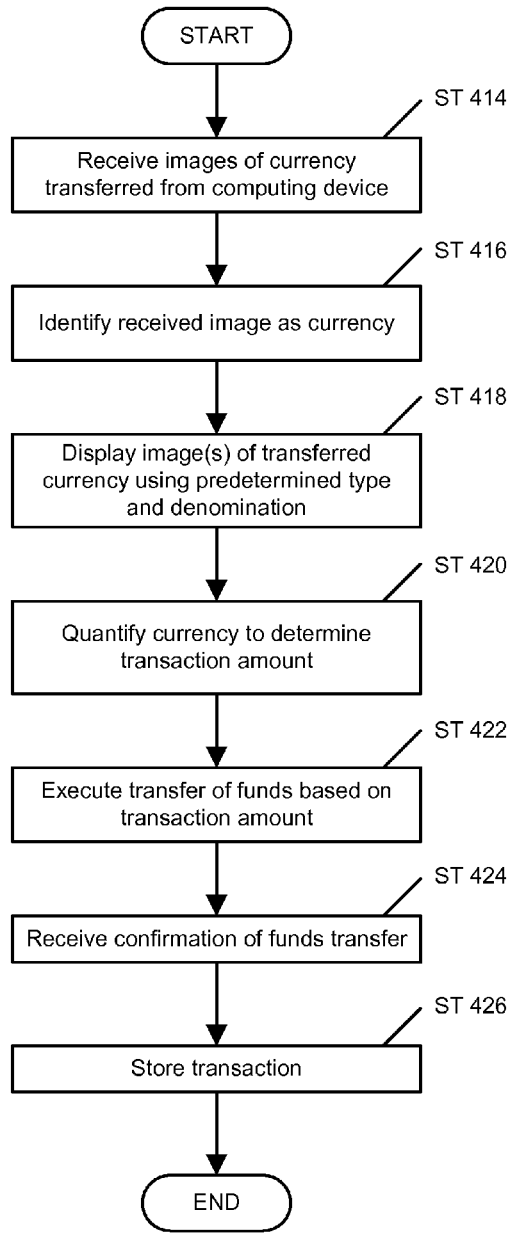
Figure 4A
Figure 4B

METHOD AND SYSTEM FOR VIRTUAL REPRESENTATION OF CURRENCY

BACKGROUND

Historically, when a consumer purchased a good or service, the transaction usually involved use of currency in the form of either cash or a check. With the advent of the credit card and, more recently, the debit card, consumers have lost the tactile experience associated with making a purchase or paying bills. Instead a typical purchase is now streamlined to the point where a consumer slides a card through a machine, optionally enters a personal identification number (PIN), and approves the purchase.

Recent studies show and experts contend that while the new approach to transactions is convenient, the loss of the tactile experience of handling cash to purchase a good or service has desensitized consumers regarding the amount of money actually being spent. In turn, consumers are outspending budgets.

SUMMARY

In general, in one aspect, the invention relates to a method for representing a transfer of currency during a transaction. The method involves establishing a network connection with a computing device, receiving, from the computing device, transactional data associated with the transaction, receiving currency data associated with a financial account and displaying a pictorial representation of currency based on the currency data, wherein a first currency type and a currency denomination are depicted as a portion of the pictorial representation. The method further involves designating an amount of currency from the pictorial representation to obtain image data, wherein the amount of currency is sufficient to complete the transaction, transmitting the image data to the computing device as part of the transaction, and sending instructions to transfer the amount of currency from the financial account based on the image data and the transactional data.

In general, in one aspect, the invention relates to a method for representing a transfer of currency at a point of sale. The method involves establishing a network connection with a computing device in proximity to the point of sale, assessing and transmitting, to the computing device, an amount of currency to transfer, receiving, from the computing device, transactional data comprising the amount of currency to transfer, displaying the amount of currency to transfer as a pictorial representation of currency, wherein a first currency type and a currency denomination are depicted as a portion of the pictorial representation, and executing a transfer of funds to a financial account associated with a user of the computing device based on the transactional data.

In general, in one aspect, the invention relates to a system for representing a transfer of currency. The system includes a first computing device configured with functionality to transmit and receive transactional data associated with a transaction and currency data associated with a financial account, display a pictorial representation of currency based on the currency data, wherein a first currency type and a currency denomination are depicted as a portion of the pictorial representation, designate an amount of currency from the pictorial representation to obtain image data, wherein the amount of currency is sufficient to complete the transaction, transmit the image data as part of the transaction, and send instructions to transfer the amount of currency from the financial account based on the image data and the transactional data. The system further includes a financial entity associated with the financial account, operatively connected to the first computing device, and configured with functionality to establish a network connection with the first computing device, transmit and receive transactional data and currency data associated with the financial account, and receive instructions to transfer the amount of currency from the financial account based on the image data and the transactional data.

In general, in one aspect, the invention relates to a computer readable medium comprising a plurality of executable instructions for representing a transfer of currency during a transaction. The plurality of executable instructions contain functionality for establishing a network connection with a computing device, receiving, from the computing device, transactional data associated with the transaction, receiving currency data associated with a financial account and displaying a pictorial representation of currency based on the currency data, wherein a first currency type and a currency denomination are depicted as a portion of the pictorial representation, designating an amount of currency from the pictorial representation to obtain image data, wherein the amount of currency is sufficient to complete the transaction, transmitting the image data to the computing device as part of the transaction, and sending instructions to transfer the amount of currency from the financial account based on the image data and the transactional data.

Other aspects and advantages of the invention will be apparent from the following description and the appended claims.

BRIEF DESCRIPTION OF DRAWINGS

FIGS. 4A and 4B show flowcharts of a method in accordance with one or more embodiments of the invention.

DETAILED DESCRIPTION

Figure 1:
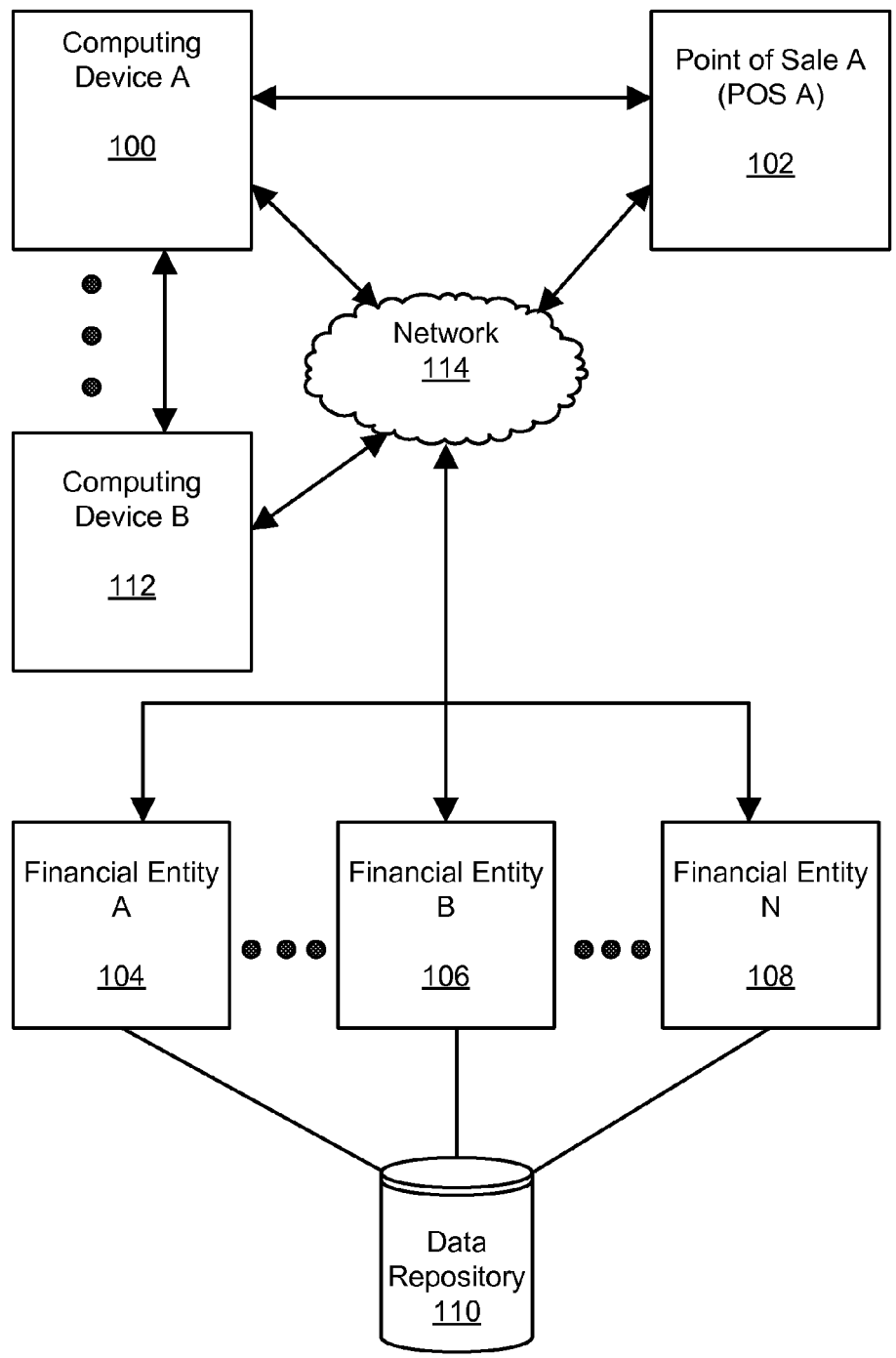
FIG. 1 shows a data flow diagram of a system in accordance with one or more embodiments of the invention.

Specific embodiments of the invention will be described in detail with reference to the accompanying figures. Like elements in the figures are denoted by like reference numerals for consistency.

In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the invention.

In general, embodiments of the invention relate to pictorially displaying currency intended to be transferred in the execution of a transaction. More specifically, one or more embodiments of the invention relate to establishing a connection between a computing device and a point of sale system, pictorially displaying on the computing device a type and denomination of currency available in an account, designating an image of currency to transfer from the account, transmitting the image of the designated currency to a receiving device, sending instructions to transfer funds from an account based on the images transmitted, and receiving confirmation that the funds were transferred.

FIG. 1 shows a system in accordance with one or more embodiments of the invention. The system includes a computing device A (100), a point of sale (POS) terminal (102). The computing device A (100) is operatively connected to the POS (102). Computing device A and/or the POS may be operatively connected to a financial entity (e.g., financial entity A (104), financial entity B (106), financial entity C (108)), each of which may be operatively connected to a data repository (110). The system optionally includes a second computing device, computing device B (112), which may be operatively connected to computing device A (100), the POS (102), and a financial entity (e.g., financial entity A (104), financial entity B (106), financial entity C (108)). These components may be capable of accessing a network (114) (e.g. Internet, Intranet, Extranet, Local Area Network (LAN), Wide Area Network (WAN), or other network communication methods), with wire and/or wireless segments. Each of the components is described below.

In one or more embodiments of the invention, a computing device (e.g., computing device A (100), computing device B (112)) is a machine that manipulates input data according to a list of instructions and creates an output. The computing device (e.g., computing device A (100), computing device B (112)) may either be a mobile device (e.g., mobile phone, personal digital assistant (PDA), notebook computer, or other mobile computing device), or a stationary computing device (e.g., desktop personal computer (PC), server, kiosk, or other computing device).

In one or more embodiments of the invention, a POS (102) is a computing device used to complete a transaction. Specifically, a POS (102) refers to the hardware and software used by a retailer to execute transactions. A POS (102) may refer to a checkout counter, or the location where a transaction occurs. POS systems (102) may be used at supermarkets, restaurants, hotels or any type of retail establishment, and may either be stationary or mobile. Those skilled in the art will appreciate that a POS (102) may be any system used in the execution of a transaction at the time of a purchase or transaction.

In one or more embodiments of the invention, the computing device (e.g., computing device A (100), computing device B (112)) and/or POS (102) are operatively connected to a financial entity (e.g., financial entity A (104), financial entity B (106), financial entity C (108)). Examples of a financial entity are a bank or credit union, a credit card company, a stock brokerage, as well as the financial or accounting department of a business. Those skilled in the art can appreciate that this in not an exhaustive list of financial entities. In one or more embodiments of the invention, these financial entities (e.g., financial entity A (104), financial entity B (106), financial entity C (108)) are operatively connected to a data repository (110). The data repository (110) may be a server, or any device capable of storing financial data.

Figure 2:
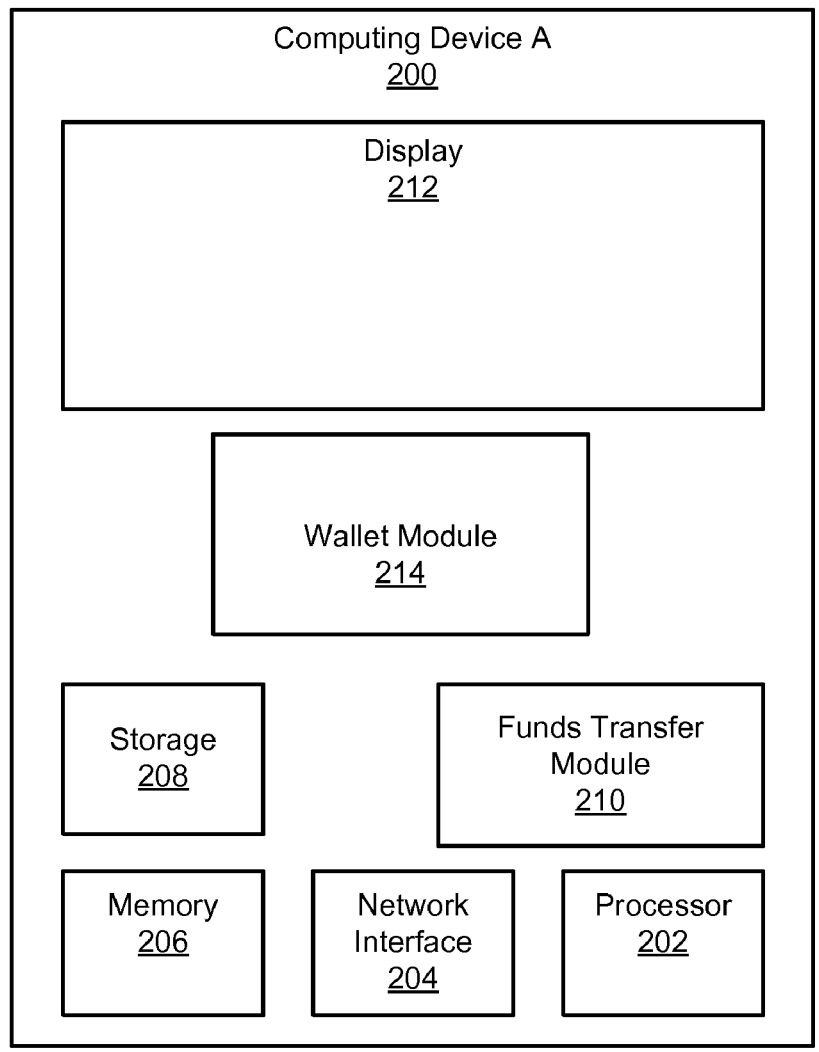
FIG. 2 shows a diagram of a computing device in accordance with one or more embodiments of the invention.

FIG. 2 is consistent with one or more embodiments of the invention, and shows the computing device (e.g., computing device A (100), computing device B (112)) of FIG. 1 in more detail. In one or more embodiments of the invention, the computing device (200) is configured with a processor (202), a network interface (204) which allows the sending device to be operatively connected to a network, memory (206) (e.g., random access memory (RAM), cache memory, flash memory, etc.), data storage (208) (e.g., a hard disk, an optical drive such as a compact disk drive or digital video disk (DVD) drive, a flash memory stick, etc.), a funds transfer module (210), and a display screen (212).

In one or more embodiments of the invention, the computing device (200) is configured to have a funds transfer module (210). The funds transfer module (210) may provide instructions to execute the transfer of funds between financial entities (e.g., a bank, credit union, etc.) to reflect an underlying transaction. Instructions may include transactional information, including the amount to be transferred, financial entity data, authorization data, acceptance of the transaction by the parties, as well as other data needed to transfer funds between financial entities. Those skilled in the art will appreciate that the list of aforementioned instructions may not constitute an exhaustive list of information needed to execute a transfer of funds.

In one or more embodiments of the invention, the computing device (200) is configured to have a display (212) allowing the user to view output on a display screen. In one or more embodiments of the invention, the computing device is configured to have a touch screen display (212) allowing the user to interact with the display by touching to screen to make selections and manipulate output on the screen. Examples of a touch screen can be commonly seen at bank ATM kiosks which allow the user to touch the screen to input answers to questions posed by the ATM during the course of the transaction.

In one or more embodiments of the invention, the computing device (200) is configured with a wallet module (214) capable of obtaining account or transaction data, manipulating the data, translating the data into a pictorial representation of currency which may be viewed on a display (212), designating currency to be used in a transaction, and transmitting image data of selected currency to a POS system or other computing device.

As used and described herein in accordance with one or more embodiments of the invention, currency is something used as a medium of exchange and an account is a financial account with a financial entity describing the financial position of the customer relative to the entity, or a statement of financial transactions, or any description of currency or financial data that may be conceivably compiled. Further, in one or more embodiments of the invention, the financial account is controlled (i.e., owned or with rights to access) by a user of a computing device. Those skilled in the art will appreciate that an account may be used to describe many more circumstances than the formal relationship between a customer and a financial entity.

In one or more embodiments of the invention, the wallet module (214) is configured to access, retrieve, and provide as output account data, including, but not limited to a user's financial entity information, the amount of currency in the account, available balance, recent transactions, account fees, and overdrafts. In one or more embodiments of the invention, the account data is provided by a financial entity (e.g., a bank, credit union, etc.) over a network connection established between the computing device (200) and the financial entity. In one or more embodiments of the invention, the wallet module (214) may access account data through user input, from memory (206) or storage (208) onboard the computing device (200), or by other means. Those skilled in the art will appreciate that account data may encompass a wide range of information associated with an account, and that this data may be input into the wallet module via the network or a variety of media.

In one or more embodiments of the invention, the wallet module (214) is configured to translate account data into a pictorial representation that may be viewed on the display (212). The wallet module (214) may receive account data as input and pictorially display the information in a variety of formats and layouts as determined by the display instructions. Those skilled in the art will appreciate that instructions related to the display of data may come from a multitude of sources.

In one or more embodiments of the invention, the wallet module (214) is configured to designate currency and account data to be manipulated or used in a transaction. Designation of account data or currency may be achieved by receiving user input selecting the currency or data, or by other means. The account data or images of currency selected are then denoted by the wallet module (214) as currency to be manipulated or used in a transaction.

In one or more embodiments of the invention, the wallet module (214) is configured to receive account data or transactional input and manipulate the data. Manipulation of the data may include, but is not limited to, dividing the currency into denominations, combining account balances, setting budgets, limiting currency which may be utilized, calculating foreign exchange rates, adding or subtracting currency images from the account balance after a transaction, applying the currency towards a transaction, categorizing transactions according to time, type and amount, or other manipulation of the account data. Those skilled in the art will appreciate that manipulation of account data may encompass a wide variety of actions, including some or all of the aforementioned actions.

In one or more embodiments of the invention, the wallet module (214) is configured to conduct transactions. The wallet module may execute transactions including, but not limited to, purchases, receipts, account transfers, loan payments, currency exchanges, or other types of transaction. Those skilled in the art will appreciate that transactions may include some or all of the aforementioned activities, as well as many other actions.

In one or more embodiments of the invention, the wallet module (214) is configured to transmit image data of the designated currency to be manipulated or used in a transaction. The data associated with the designated currency may be transmitted to a receiving POS or computing device where the data may be used as input in execution of a transaction.

Figure 3:
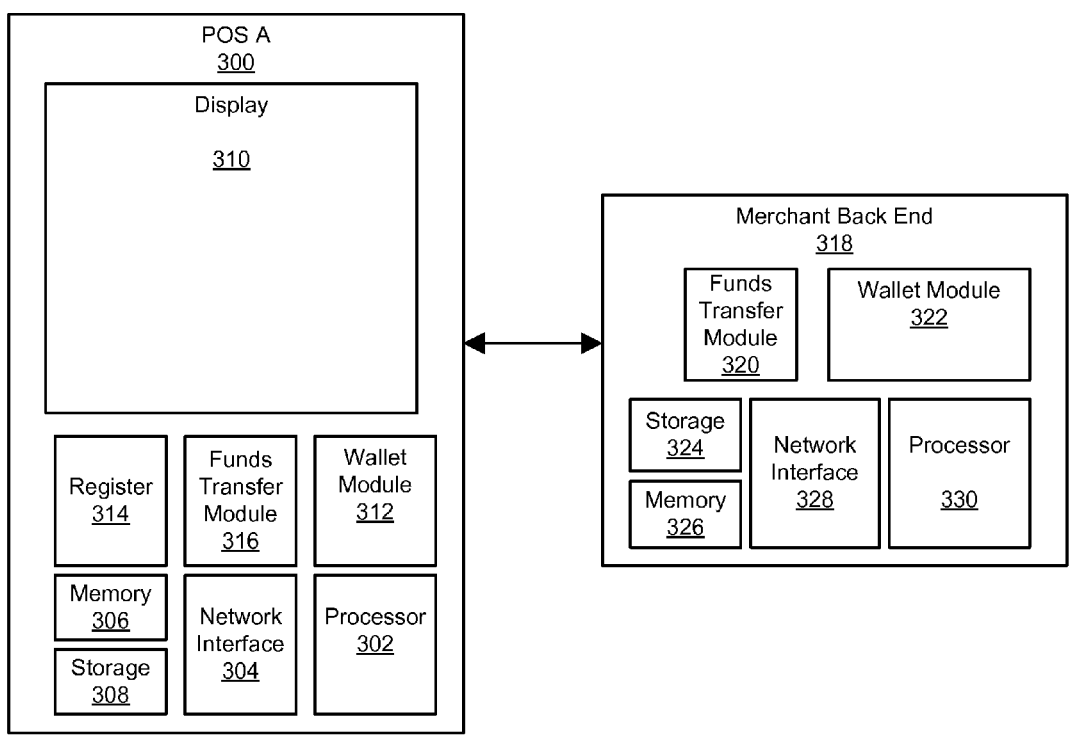
FIG. 3 shows a diagram of a system in accordance with one or more embodiments of the invention.

FIG. 3 is consistent with one or more embodiments of the invention, and shows a POS device, for example, the POS (102) in FIG. 1, in greater detail. In one or more embodiments of the invention, the POS (300) is configured to have a processor (302), a network interface (304) (allowing the POS to operatively connect to a network (not shown), with wire and/or wireless segments), memory (306), data storage (308), a display (310), and a wallet module (312) which is configured in a manner consistent with the wallet module described above.

In one or more embodiments of the invention, the POS is configured to have a register module (314). The register module may be capable of calculating the cost of a purchase, applicable taxes, and total amount due in the transaction. In essence the register module provides the POS with the functionality of a modern electronic cash register.

In one or more embodiments of the invention, the POS is optionally configured to have a funds transfer module (316). The funds transfer module provides functionality consistent with the funds transfer module described as part of the computing device above.

In one or more embodiments of the invention, the POS is operatively connected to a merchant back-end server (318) which is configured to have a processor (330), network interface (328), memory (326), and storage (324). The POS may provide transaction information, including the cost of goods sold, items sold, method of payment, and inventory data, to the server for processing. In one or more embodiments of the invention, the back-end server may be configured with a funds transfer module (320) and a wallet module (322), which are configured in a manner consistent with the descriptions above. The POS (300) may provide the necessary transaction information to the back-end server to facilitate a transfer of funds which is then executed by the back-end server (318). Those skilled in the arts will appreciate that the transaction information provided by the POS (300) to the back-end server (318) may include some or all of the aforementioned information, or an even wider array of data, and that the POS (300) and back-end server (318) may act as an integrated computing device or be separate.

FIG. 4A shows a flow chart in accordance with one or more embodiments of the invention. Initially, a network connection is established between the first computing device (hereafter, "sending device") and either a POS or second computing device (hereafter, "receiving device") (ST 400). The sending device pictorially displays currency which is associated with an account (ST 402) and designates an image of the currency for the purpose of either executing a transaction, or manipulating the account data or currency in the account (ST 404). Upon designation of the currency image, the sending device may transmit the currency image data to a receiving device (ST 406). As necessary, the sending device may transmit instructions to transfer actual funds consistent with the currency image data that was transmitted to the receiving device (ST 408). Confirmation of the actual transfer of funds may be received by the sending device (ST 410), and a record of the transaction is stored (ST 412).

Pictorial display of the currency associated with an account (ST 402) may require account data to be used as a basis for the display. Account data, including the amount of currency associated with the account and other account data can be obtained in a variety of ways. In one or more embodiments of the invention, the sending device establishes a network connection with a financial entity responsible for maintenance of the account and downloads the data from the financial entity. In one or more embodiments of the invention, the user may directly enter account data through a keyboard or have the information be read from computer readable media. Those skilled in the art will appreciate that input consisting of account information and data can be derived from variety of sources, including, but not limited to those mentioned above.

Pictorially displaying the type and denomination of the currency may also require manipulation of the raw account data. Manipulation of the account data may consist of dividing the currency into different denominations, categorizing the currency by the type of account (e.g., saving, checking, money market, brokerage account, auto loan, or other type of account), combining account balances, setting budgets or limiting currency which may be used, calculating foreign exchange rates, adjusting the account balance after a transaction, applying the currency towards a transaction, categorizing transactions according to time, type and amount, or other manipulation of the account data. Those skilled in the art will appreciate that account information and data may be manipulated in many ways.

As an example of manipulating account information and data for display, in one or more embodiments of the invention, the sending device obtains account data including the available balance in an account given in a particular currency; however, the data must be manipulated to display the currency in a manner more suitable to the user. In doing so, the sending device manipulates and then displays the denomination of currency in a variety of ways. For example, if an account has a currency of 100 bills available, the invention can pictorially display the available balance as one 100 bill, five 20 bills or twenty 5 bills. Of course, the currency can be divided up differently. For example if the display originally showed one stack of 1,000 currency in denominations of 100 bills, the display could be manipulated to show a stack of five 100 bills, a stack of three 100 bills and a stack of two 100 bills. In one or more embodiments of the invention, the data could be manipulated to select a particular bill and "break" it. For instance, a $20 bill of currency may be broken into one $10 bill, one $5 bill, and five $1 bills. The reverse is also true. Several small denominations may be consolidated into larger denominations.

In one or more embodiments of the invention, if a user requests to convert the currency from one type to another, this too is possible. For instance, the same 100 bill of currency X in the account could be displayed as 50 bills of currency Y (assuming an exchange rate of 1X bill for 0.5Y bill). The 50 bills of currency Y may be displayed in various denominations, including, five 10 bills, or two 20 bills and one 10 bill, and so on. Further manipulation of the data may provide a user with images tailored to requests. Manipulation of account information and data may take place at any time, and may be appropriate after account information is downloaded and images are designated for manipulation. It will be apparent to one of ordinary skill in the art that many ways are possible for one to represent a sum of money pictorially by breaking, consolidating, and/or dividing the currency.

The actual format and layout of the pictorial display of currency may be effectuated in several ways at the discretion of the user, determined by limitations or capabilities of the device or determined by other means. In one or more embodiments of the invention, bills and coins are stacked in a three-dimensional representation with each denomination having its own stack. In one or more embodiments of the invention, the face of the bill or the coin is shown with a number associated with each bill representing how many of each denomination are available. In one or more embodiments of the invention, a choice exists regarding the appearance of the bills. In one or more embodiments of the invention, a number representing the total amount of the available balance may be shown. In one or more embodiments of the invention, the display indicates the amount of currency selected for a transaction, the total amount of the transaction, and the amount due. Those skilled in the art will appreciate that currency may be displayed in a multitude of different ways.

Continuing with FIG. 4A, an image of currency may be designated on the sending device (ST 404). Designation of the currency image denotes that the currency may either be manipulated, as described above, or used in a transaction. In one or more embodiments of the invention, the user has the ability to select pictorial images of currency for designation. In one or more embodiments of the invention, the selections may be accomplished on a touch-screen by physically touching the screen to select the currency. Alternatively, the currency may be selected by means of input from a keyboard, joystick, mouse, or other device. In one or more embodiments of the invention, the rules provided by software or a user may be used to dictate the selection of currency. Once the selection is made, the currency selected is then designated for manipulation or use in a transaction. Those skilled in the art will appreciate that designation of the currency image may be achieved in a variety of ways, including, but not limited to the aforementioned methods.

Continuing with FIG. 4A, upon designating the image of currency, the data associated with the currency image may be transmitted to the receiving device (ST 406). This data may, in turn, be used for further completion of a transaction or displaying the image of currency on a receiving device. Additional manipulation of account data may be required to pictorially reflect and account for the currency image transfer. Those skilled in the art will appreciate that the currency image data transmitted to the receiving device will need to encompass information required to further the transaction.

In one or more embodiments of the invention, the transaction may be between two accounts which are both represented on the sending computing device. In this case, image data may not need to be transmitted to a receiving device. For example, if a transaction consisted of transferring currency from a savings account to a checking account transmission of the image data to a receiving device may not be necessary.

Once the currency image data is transferred from the sending device to the receiving device or a transaction is represented, a need exists for a corresponding transfer of actual currency from one account to another in order to reconcile the actual accounts and properly reflect the transfer of currency image data (ST 408). In other words, after the image of currency is transferred, actual payment may need to follow. In order to execute this transaction, the sending device may provide transactional information, including identifying the user account and financial entity, supply authorization information (e.g., user identification, personal identification number), and approval of the transaction. This information may be communicated directly to the financial entity associated with the sending device by means of a network connection, or transmitted to the receiving device to be used in processing the transaction.

In one or more embodiments of the invention, upon completion of the transfer of funds, the sending device may receive a confirmation that the funds are indeed transferred (ST 410). In one or more embodiments of the invention, the sending device may store a record of the transaction (ST 412) either in memory, on a storage device, or on some other computer writable media.

FIG. 4B shows a flow chart in accordance with one or more embodiments of the invention. A receiving device may be a POS or other form of computing device. The receiving device accepts currency image data from a sending device (ST 414) and identifies that data as currency data (ST 416). Images of the currency are then displayed by the receiving device using a predetermined type and denomination of currency (ST 418). The amount of currency represented by the transfer of the currency image data is then quantified (ST 420). The receiving device then executes a transfer of actual funds based on the amount of currency represented by the currency image data (ST 422), receives a confirmation that the transfer of actual funds is complete (ST 424), and stores a record of the transaction (ST 426).

In one or more embodiments of the invention, purchase information may be communicated to the sending device to be used as input to initiate a transaction. For example, if a $50 shirt is being purchased, then the receiving device transmits the sending device an image of $50. In one or more embodiments of the invention, the receiving device functions as a modern electric cash register and is used to calculate purchase information, including the cost of goods or services to be purchased, the subtotal amount, applicable taxes, redemption of coupons or rebates and a final total purchase amount. Those skilled in the arts will appreciate that the receiving device may have the capability to operate as a register and be configured to perform some or all of the aforementioned functions.

The receiving device, in turn, receives currency image data from the sending device representing the amount of actual currency to be transferred (ST 414). In one or more embodiments of the invention, receipt of the data may be facilitated through use of a network connection between the sending and receiving devices, or by other means. The currency image data may include data used to compose the image of currency on the display of the receiving device, as well as the amount, denomination, type and exchange rate of currency represented by the image. Using the currency image data transmitted from the sending device, the receiving device may identify the received image data as data representing currency (ST 416). Those skilled in the art will appreciate that currency image data may consist of more attributes than the aforementioned list.

To use the currency image data received from the sending device, the receiving device may need to manipulate the data. Manipulation of the currency image data may include dividing the currency into different denominations of currency, categorizing the currency by the type of account (e.g., saving, checking, money market, brokerage account, auto loan, or other type of account), combining account balances, setting budgets, restricting currency to be used, calculating foreign exchange rates, adjusting the account balance after a transaction, applying the currency towards a transaction, categorizing transactions according to time, type and amount, or other manipulation of the account data. Those skilled in the art will appreciate that account information and data may be manipulated in many ways and that this manipulation may take place at any time during the processing of a transaction.

The receiving device may display an image of the currency as represented by the image data received from the sending device (ST 418). In other words, the receiving device displays the amount of currency that is transferred by the sending device in accordance with one or more embodiments of the invention. The display of currency may be carried out either pictorially, though the use of text, or by other means. In one or more embodiments of the invention, the currency image data transferred from the sending device is displayed on the receiving device in a pictorial format consistent with the pictorial format of the display on the sending device. Alternatively, the display may be in a pictorial format that does not match the pictorial format used by the sending device, or the currency may be represented in text. Those skilled in the art will appreciate that the representation of currency image data transferred by the sending device can be accomplished in many ways including several different types of pictorial display or the use of text.

The receiving device may quantify the currency represented by the currency image data to determine a transaction amount (ST 420), and then execute a transfer of funds based on the transaction amount (ST 422). In one or more embodiments of the invention, the receiving device may execute a transfer of funds by sending instructions to a financial entity describing the amount of the transaction, the financial entity from which funds will be withdrawn, the financial entity into which funds will be deposited, and authorization, identity and approval information of the parties. Those skilled in the art will appreciate that while some or all of the information mentioned above may be needed to complete a transfer of funds, additional information may be required.

In one or more embodiments of the invention, upon completion of the transfer of funds, the receiving device may receive a confirmation that the funds are indeed transferred (ST 424). In one or more embodiments of the invention, the receiving device may store a record of the transaction (ST 426) either in memory, on a storage device, or on some other computer writable media.

Figure 5A:
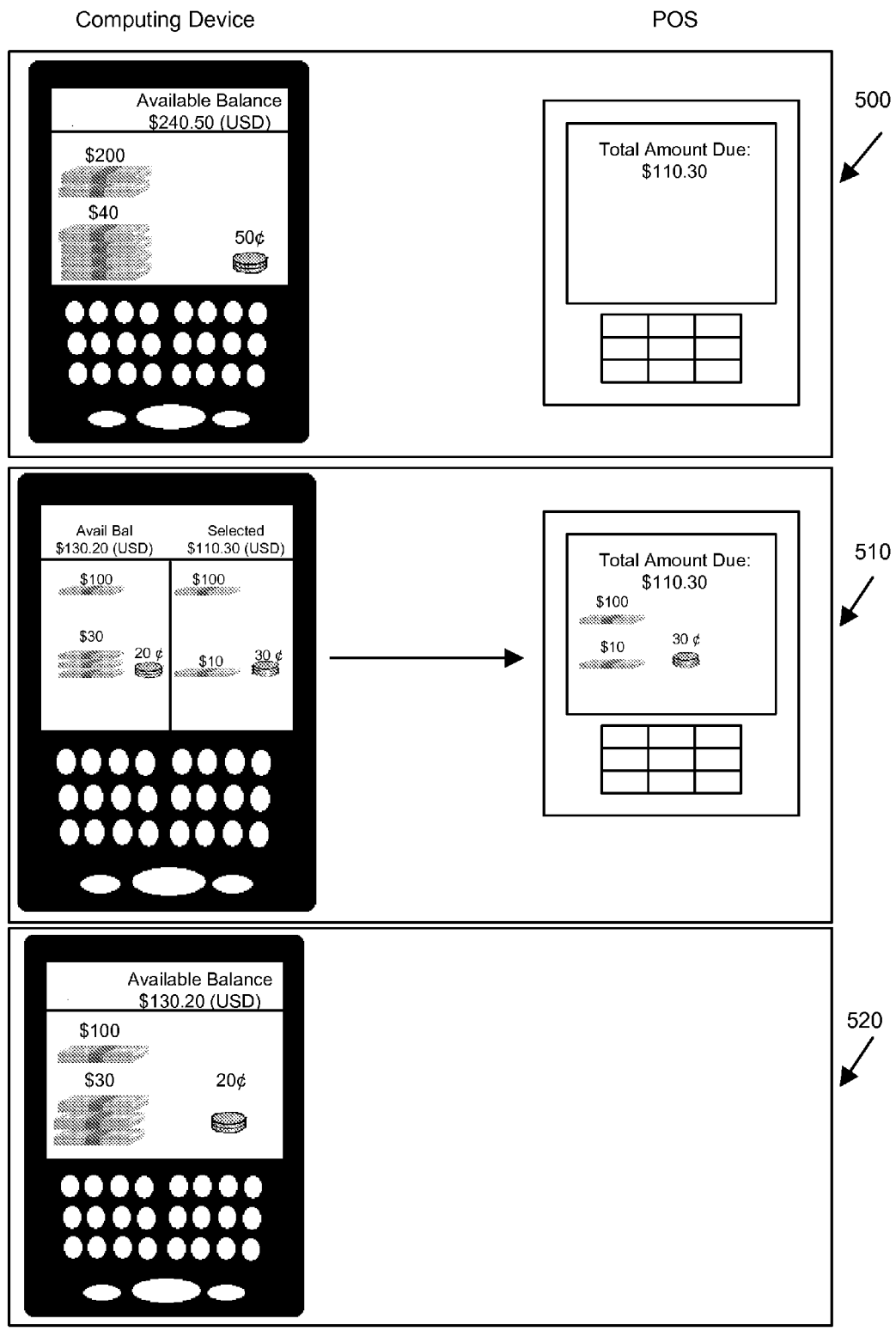
FIGS. 5A, 5B, and 5C show an example in accordance with one or more embodiments of the invention.
Figure 5B:
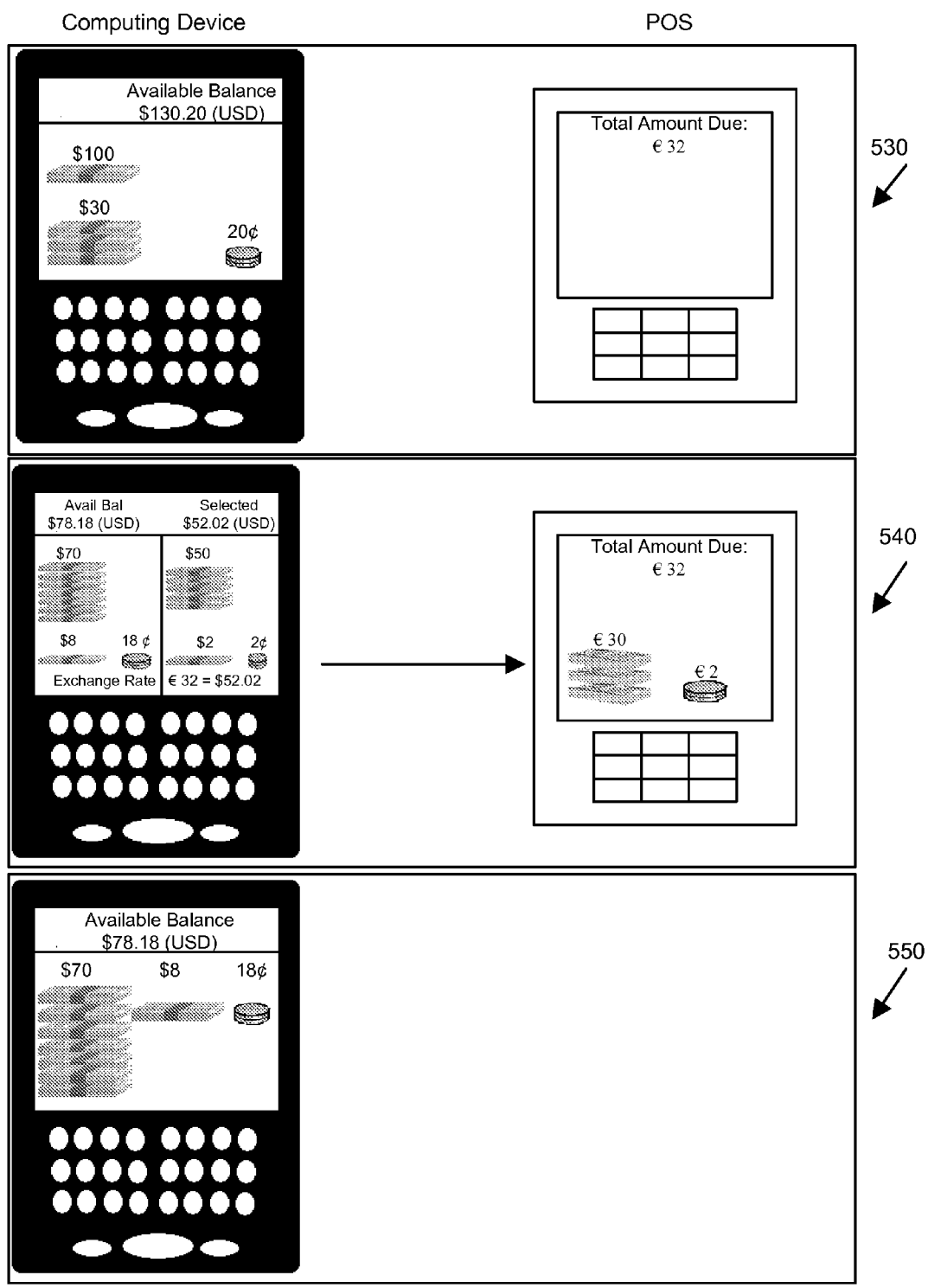
Figure 5C:
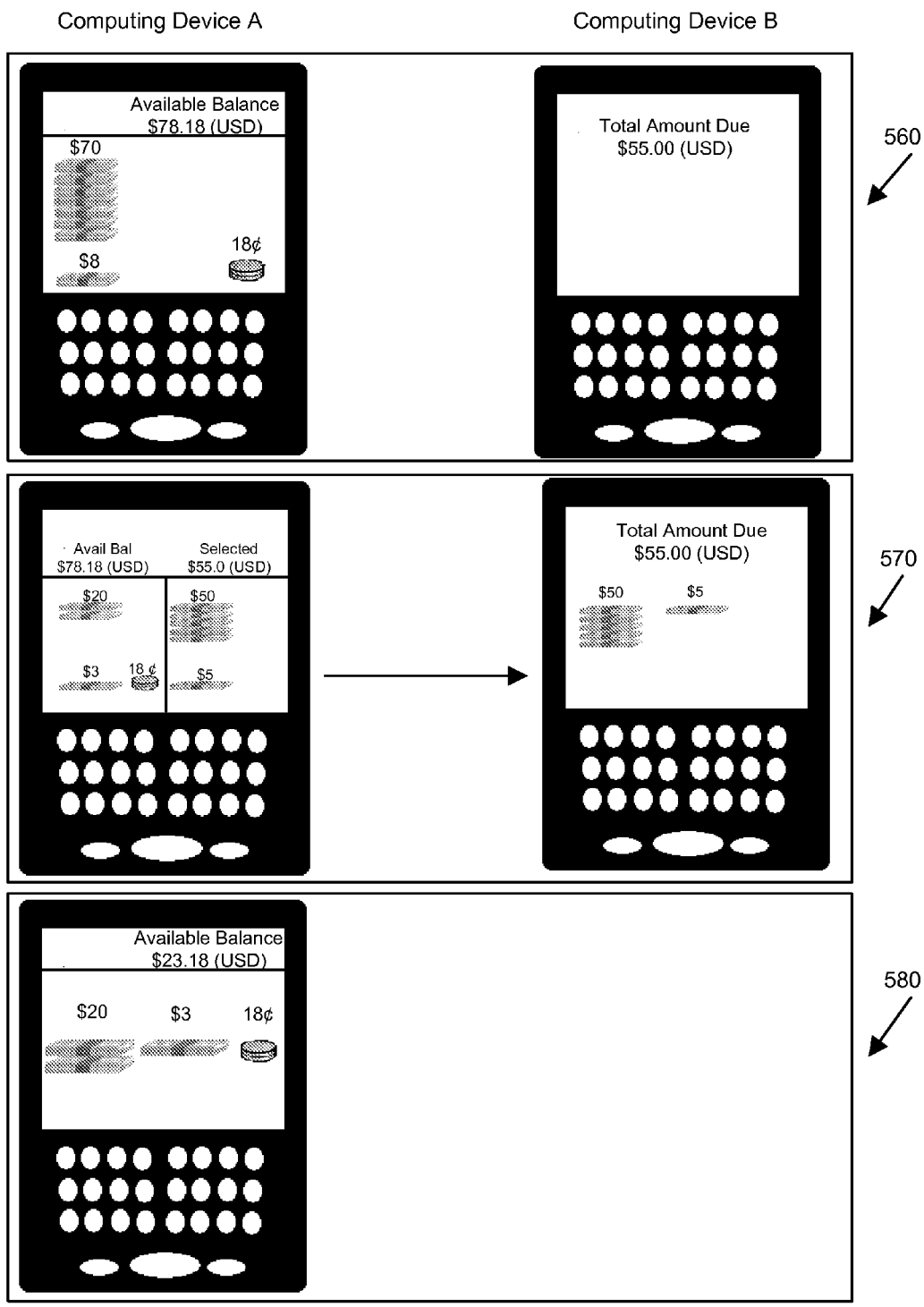

FIGS. 5A, 5B, and 5C show an example in accordance with one or more embodiments of the invention. Specifically, FIGS. 5A, 5B, and 5C show one example of what a user of the systems described in FIGS. 1, 2, and 3 might see.

FIG. 5A shows one example of a user experience using the system to make a purchase at a POS. In (500), the available account balance of $240.50 can be seen on the computing device, both in pictorial form and text form. The POS terminal displays the amount due, $110.30. In (510), the user selects $110.30 with which to pay the amount owed. The user may select the amount due in a variety of ways. For example, the user may use a keypad to type in the amount due. Alternatively, the computing device may be equipped with a touch screen, enabling the user to "drag" money from the available balance side to the payment side, or select money with which to pay. One of ordinary skill in the art will recognize that there are numerous ways with which to input or select the amount due. After selecting the amount due, the user of the computing device transmits that amount to the POS. That amount of money then appears on the POS terminal, indicating that the transfer is completed. In (520), the user may observe the updated account information displayed on the computing device. This may be one of many ways to receive confirmation that the transaction was successfully completed.

FIG. 5B shows another example of a user experience using the system to make a purchase at a POS. The process is the same as described in FIG. 5A, however in this example, the POS is located in a country whose currency is the Euro. In (530), the account balance of the user, $130.20, is displayed in pictorial and textual form on the computing device. The POS displays the amount to be paid, €32. In (540), the user has selected $52.02 with which to pay the balance. The computing device displays the exchange rate; in this case €32 is equal to $52.02. After the user selects the amount to pay, that amount is transmitted to the POS, and is displayed in the POS's native currency, Euros. In (550), the updated account balance of the user is displayed on the computing device.

FIG. 5C shows a transfer between two computing devices, device A and device B. In (560), the account balance of the user of device A is shown, and the amount due is shown on computing device B. In (570), the user of device A selects the amount to pay, and transmits it over to device B. Device B receives the amount and displays it on its screen. In (580) the account balances of both users are updated.

Figure 6:
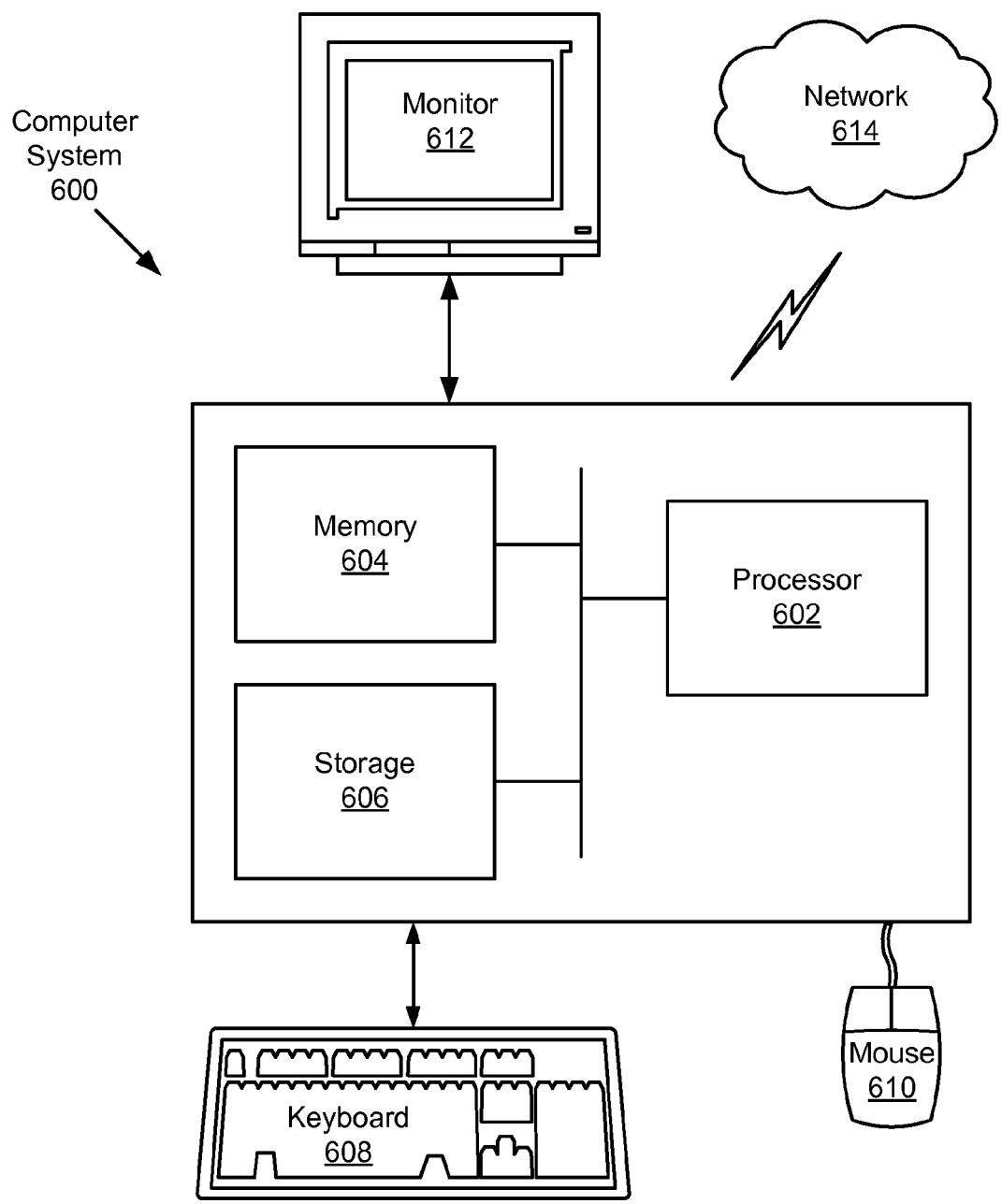
FIG. 6 shows a diagram of a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600)

includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., application data storage, aggregation engine, data analysis engine, rules engine, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for representing a transfer of currency during a transaction comprising:
    establishing a network connection with a computing device and a financial entity;
    identifying an available balance of a financial account from the financial entity;
    displaying, on a touchscreen, an available balance region and a payment region, wherein the available balance region comprises a plurality of currency images corresponding to the available balance;
    receiving, from a user and via the touchscreen, a selection of a currency image corresponding to at least a portion of a transaction amount of the transaction;
    relocating, in response to the selection, the currency image from the available balance region of the touchscreen to the payment region of the touchscreen;
    transmitting currency image data corresponding to the currency image to the computing device;
    sending instructions, to the financial entity, to transfer funds corresponding to the transaction amount from the financial account; and
    removing the payment region from the touchscreen.

2. The method of claim 1, further comprising:
    converting the transaction amount from a first currency type to a second currency type.

3. The method of claim 1, further comprising:
    receiving a confirmation of a successful transfer of the funds corresponding to the transaction amount.

4. The method of claim 3, further comprising:
    completing the transaction upon receiving the confirmation.

5. The method of claim 1, wherein the network connection comprises a wireless component.

6. A computer readable medium comprising a plurality of executable instructions for representing a transfer of currency during a transaction, wherein the plurality of executable instructions comprise functionality for:
    establishing a network connection with a computing device and a financial entity;
    identifying an available balance of a financial account from the financial entity;
    displaying, on a touchscreen, an available balance region and a payment region, wherein the available balance region comprises a plurality of currency images corresponding to the available balance;
    receiving, from a user and via the touchscreen, a selection of a currency image corresponding to at least a portion of a transaction amount;
    relocating, in response to the selection, the currency image from the available balance region of the touchscreen to the payment region of the touchscreen;
    transmitting currency image data corresponding to the currency image to the computing device;
    sending instructions, to the financial entity, to transfer funds corresponding to the transaction amount from the financial account; and
    removing the payment region from the touchscreen.

7. The computer readable medium of claim 6, wherein the plurality of executable instructions further perform:
    converting the transaction amount from a first currency type to a second currency type.

8. The computer readable medium of claim 6, wherein the plurality of executable instructions further perform:
    receiving a confirmation of a successful transfer of the funds corresponding to the transaction amount.

9. The computer readable medium of claim 8, wherein the plurality of executable instructions further perform:
    completing the transaction upon receiving the confirmation.

10. The computer readable medium of claim 6, wherein the network connection comprises a wireless component.

11. The method of claim 1, wherein the touchscreen comprises functionality for dragging the currency image from the available balance region of the touchscreen to the payment region of the touchscreen.

12. The method of claim 1, wherein the financial entity is a credit card company.

* * * * *